United States Patent
Grosch et al.

(10) Patent No.: US 6,676,155 B2
(45) Date of Patent: Jan. 13, 2004

(54) DRIVER'S SIDE AIRBAG MODULE

(75) Inventors: Michael Grosch, Ingelheim (DE); Valerio Poli, Tregnago (IT); Alessio Tosi, Caldiero (IT)

(73) Assignee: Breed Automotive Technology, Inc., Lakeland, FL (US)

(*) Notice: Subject to any disclaimer, the term of this patent is extended or adjusted under 35 U.S.C. 154(b) by 20 days.

(21) Appl. No.: 10/197,587

(22) Filed: Jul. 18, 2002

(65) Prior Publication Data

US 2003/0080542 A1 May 1, 2003

(30) Foreign Application Priority Data

Oct. 25, 2001 (DE) .......................... 101 52 624

(51) Int. Cl.[7] .............................................. B60R 21/16
(52) U.S. Cl. ..................... 280/731; 280/741; 280/728.1
(58) Field of Search ................. 280/731, 741, 280/728.1

(56) References Cited

U.S. PATENT DOCUMENTS

| | | | |
|---|---|---|---|
| 5,775,725 A | 7/1998 | Hodac et al. ............ 280/728.2 |
| 6,082,758 A | 7/2000 | Schenck ................... 280/728.2 |
| 6,481,745 B2 * | 11/2002 | Ford ........................... 280/731 |
| 6,508,485 B2 * | 1/2003 | Kikuta et al. ............ 280/728.2 |
| 6,595,548 B2 * | 7/2003 | Kamano et al. ......... 280/743.1 |
| 6,600,114 B2 * | 7/2003 | Kikuta et al. ............ 200/61.55 |
| 6,616,181 B1 * | 9/2003 | Ford ........................... 280/731 |

FOREIGN PATENT DOCUMENTS

| | | |
|---|---|---|
| DE | 19858691 | 6/2000 |
| DE | 19927032 | 12/2000 |
| DE | 20103890 | 8/2001 |
| DE | 20106694 | 9/2001 |
| DE | 20117140 | 5/2002 |
| EP | 0586055 | 7/1993 |

* cited by examiner

*Primary Examiner*—Christopher P. Ellis
*Assistant Examiner*—Rashmi Sharma
(74) *Attorney, Agent, or Firm*—Lonnie Drayer

(57) ABSTRACT

An airbag module has at least one airbag housing, which can be locked with a receiving device in a motor vehicle and in which at least one inflator and a folded airbag are arranged. Springs are provided on the airbag housing, which bias the airbag housing in the installed state in relation to the receiving device. The springs are arranged in the region of the outer periphery of the airbag housing.

12 Claims, 4 Drawing Sheets

DRIVER'S SIDE AIRBAG MODULE

FIELD OF THE INVENTION

The present invention relates to an airbag module and in particular a driver side airbag module for a motor vehicle.

BACKGROUND OF THE INVENTION

In airbag modules it is desirable on the one hand that the airbag module can be easily installed in a motor vehicle and on the other hand that the airbag module can also be easily dismounted for maintenance work. In known airbags threaded connectors are generally provided leading to a complicated assembly and dismounting.

SUMMARY OF THE INVENTION

An airbag module according to the invention comprises an airbag housing, in which the folded or bundled up airbag is arranged as well as an inflator. The airbag housing comprises catch elements, so that it can be locked with a receiving device in a motor vehicle. The airbag housing is preferably lockable with a steering wheel frame. This design enables the airbag housing to be secured in the vehicle without threaded connectors being required. Airbag housing springs are arranged on the periphery of the airbag housing, biasing the airbag housing in relation to the receiving device so that during dismounting, i.e. when the catch elements are released, the airbag housing is pushed away from the receiving device by the springs. The springs are arranged on the periphery of the airbag housing. This arrangement enables a very compact and in particular a flat airbag housing, which can be very easily securely connected to the vehicle structure. Due to the arrangement of the springs tilting moments in the fastening of the airbag housing on the steering wheel frame can be decreased and a more secure fastening can be achieved.

DETAILED DESCRIPTION OF THE INVENTION

Figure 1:
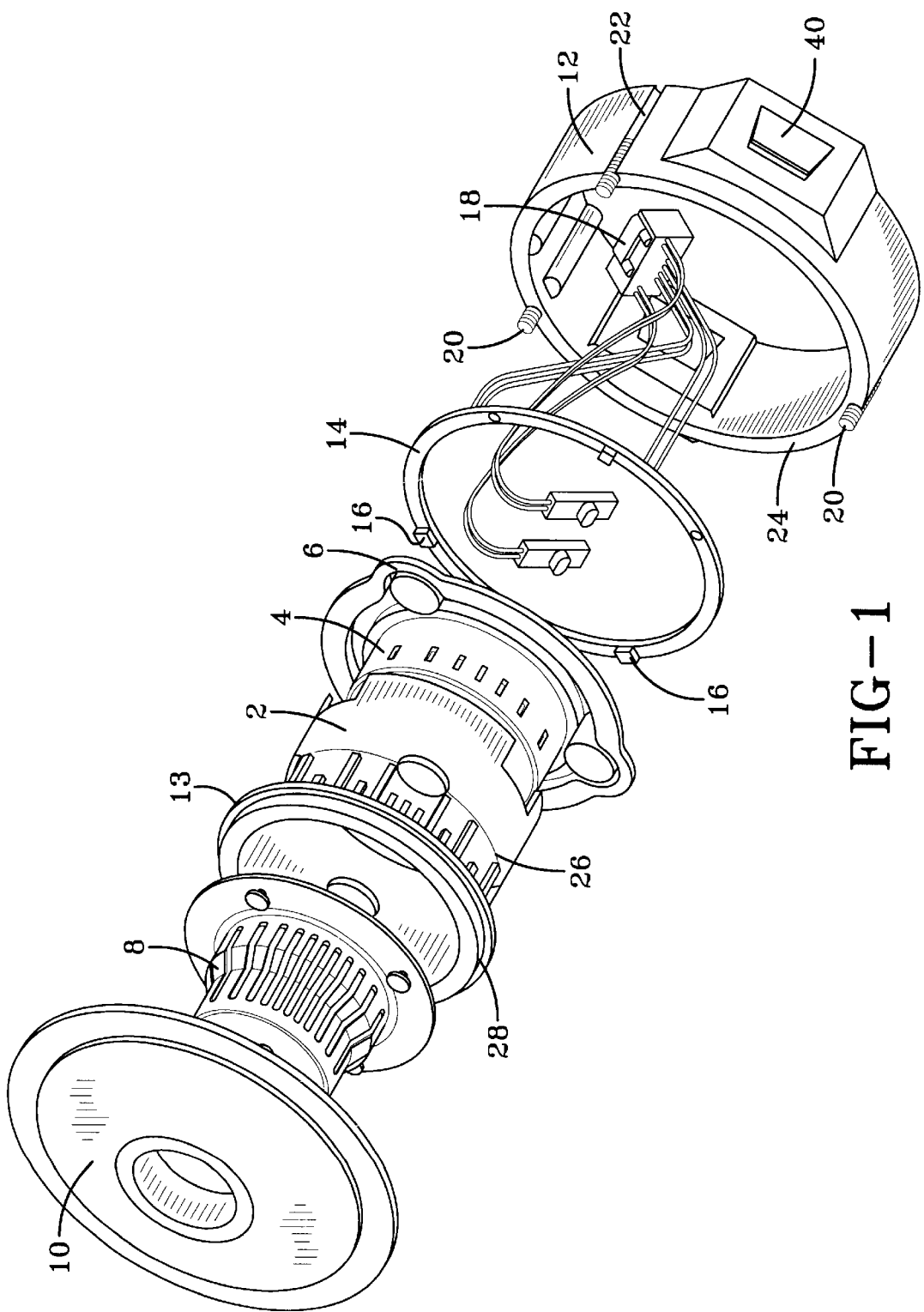
FIG. 1 is an exploded view of a preferred embodiment of the airbag module according to the invention.

As shown in FIG. 1, the airbag module comprises a cylinder or pot-shaped airbag housing 2 and an inflator 4 arranged in the latter with an inflator carrier 6. The inflator is preferably locked with the airbag housing so that during the assembly no screw action is required; a screw connection, however, is possible. A diffuser 8 is arranged above the inflator 4 in the airbag housing 2. The diffuser surrounds the inflator and extends into the inside of the airbag. The diffuser ensures an even distribution of the gas during the inflation of the airbag. The horn ring, the airbag housing, the inflator and, if applicable, the diffuser are preferably nested into each other, preferably arranged concentrically to one another. In this way a very compact airbag module is created. The inflator together with the diffuser and the folded airbag are arranged in the preferably pot-shaped airbag housing. An inflator is inserted into the airbag housing from below, i.e. from the lower longitudinal end. The airbag housing is peripherally surrounded by the horn ring on its outer side. The airbag is not shown in FIG. 1.

The airbag housing 2 is closed to the outside by a covering cap 10. In the covering cap 10, which is locked with the airbag housing 2, set breaking points are preferably provided, which in a known manner enable an exit of the airbag from the inside of the airbag housing 2. The covering cap in this case preferably forms the end of the airbag module towards a vehicle interior. The covering cap is preferably locked with the airbag housing in such a manner that in this case also a simple assembly without screw connections can take place.

The periphery of the airbag housing 2 is concentrically surrounded by a horn ring 12 on which horn contacts are arranged peripheral to the airbag housing. The airbag housing 2 is inserted into the horn ring 2 and locked with the latter. Between the horn ring 12 and a projection or a flange 13 of the airbag housing 2 a horn plate 14 is arranged. The horn plate 14 is a ring and peripherally surrounds the airbag housing 2. On the plate 14 horn contacts or microswitches 16 are arranged for the actuation of the horn. The microswitches 16 are preferably evenly distributed over the periphery, to ensure a reliable horn actuation at each peripheral position. The horn springs are thus also arranged peripheral to the airbag housing. The horn springs are preferably screw springs, which are guided in borings or grooves in the horn ring. The horn springs support themselves with their one end on the horn ring, whereas the other end engages the airbag housing, preferably on a projection or flange of the latter. In this way the airbag housing can be moved against the bias of the springs in the direction of the horn ring, in order to actuate the horn. Due to the restoring force of the springs, the airbag housing is moved back into its starting position after actuation of the horn. In addition, the horn springs fulfill a second function, in that they facilitate a dismounting or disassembly of the airbag module. When a locking between the airbag housing and the horn ring is released, the horn springs push the two components away from each other, so that the dismounting is facilitated. This enables a very easy assembly, since no screw action is required. The locking thereby preferably takes places in such a manner that a predetermined play remains in the longitudinal direction of the airbag housing. The longitudinal direction corresponds to the actuation direction of a horn and preferably the unfolding direction of an airbag. To actuate the horn, the airbag housing can thus be moved in relation to the horn ring.

The inflator 4 and the microswitch 16 are connected with a common connector plug 18 by connection cables. Since the horn and the inflator are integrated in the airbag module, it is possible to provide the entire module with just one connector plug, which comprises the trigger contacts for the inflator, earth contacts for the inflator as well as horn connections. During the installation of the airbag module in a motor vehicle, only one single connector plug needs to be connected with the vehicle electricity, whereby the assembly is further facilitated.

The horn ring 12 has bores or grooves therein in which horn springs 20 are arranged. One end of each horn spring 20 is supported by a shoulder or projection in the horn ring 12 and another end of each horn spring engages the flange 13 on the airbag housing 2, to enable a resilient motion of the airbag housing 2 in relation to the horn ring 12 for the actuation of the microswitch 16 for activating the horn function. The result is that over the entire periphery a secure horn contact or a reliable horn actuation can be ensured. The horn contacts or microswitches are preferably securely fastened to the horn ring or integrated in the latter, while the airbag housing is movable with relation to the horn ring. To actuate the horn, the airbag housing is shifted in the direction of the horn ring, so that it exercises pressure on the horn contacts or microswitches and triggers a horn function.

The springs are preferably arranged on an annular element surrounding the periphery of the airbag housing. The airbag housing is in this case preferably cylindrical or circular in shape and the annular element displays a corresponding cross section, so that it tightly surrounds the outside of the airbag housing. The springs are integrated in the annular element so that they are securely supported and guided. The springs are preferably spiral springs, which are arranged in corresponding borings of the annular element. The springs thereby support themselves preferably with one end in the annular element, whereas the second end is free and can engage the receiving device in the motor vehicle. A bias is thus created between the annular element and the receiving device. The springs 22 are arranged in additional grooves or borings in the horn ring 12. One end of each spring 22 is supported in the horn ring 12 and a second end of each spring extends fin a direction towards the rear side of the airbag module, i.e. in a direction away from the covering plate 10. When the airbag module is inserted into a motor vehicle, these free ends of the springs 22 engage a receiving device in the motor vehicle, to bias the airbag module in relation to the receiving device. If the airbag module is subsequently released, the springs 22 push the airbag module away from the receiving device, so that the airbag module can be easily removed from the vehicle. The horn ring 12 is locked with the airbag housing 2. An inwardly directed projection 24 of the horn ring 12 engages the airbag housing 2 behind a peripheral projection 26. The covering cap 10 engages the catch openings 28 in the flange 13 of the airbag housing 2 with corresponding catch elements.

Figure 2:
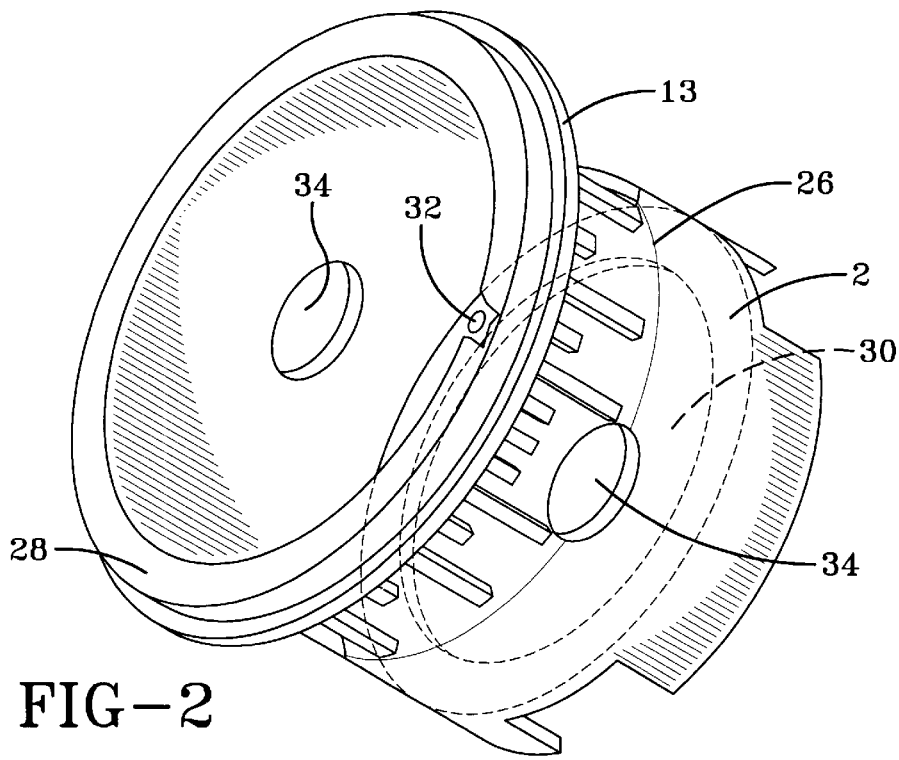
FIG. 2 is a perspective view of the airbag housing.

FIG. 2 is a perspective view of the airbag housing 2. The airbag housing 2 has on its rear side, i.e. on a rear positioned side in the unfolding direction of the airbag, a receiving opening 30 in which the inflator 4 is inserted. Peripheral to the receiving opening 30, fastening openings 32 are provided, in which fastening elements of the inflator 4 or inflator carrier 6 or the diffuser 8 can engage. The airbag housing 2 is essentially cylindrical in shape and comprises at its front side an opening, which is closed by the covering cap 10. To this effect, in the peripheral flange 13, which extends outwardly in the region of the opening on the front side of the airbag housing 2, engagement openings 28 are provided, in which at least one catch of the covering cap 10 can engage. The flange 13 serves in addition to engage with the horn springs 20 as well as the microswitches 16 or horn contacts, to activate a horn function. In addition, on the periphery of the airbag housing 2 an annular projection 26 is provided, which engages or is locked with the projection 24 on the horn ring 12. Furthermore, gas emission openings 34 are foreseen on the periphery of the airbag housing 2, enabling a flow of excess gas, for instance during the impact of a vehicle occupant on the inflated airbag. The arrangement of the gas emission openings 34 in the airbag housing 2 has the advantage that the escaping gas can be guided towards the rear, i.e. in a direction away from a vehicle occupant. This has the advantage that a contact of the vehicle occupant with the escaping gas can be avoided.

Figure 3:
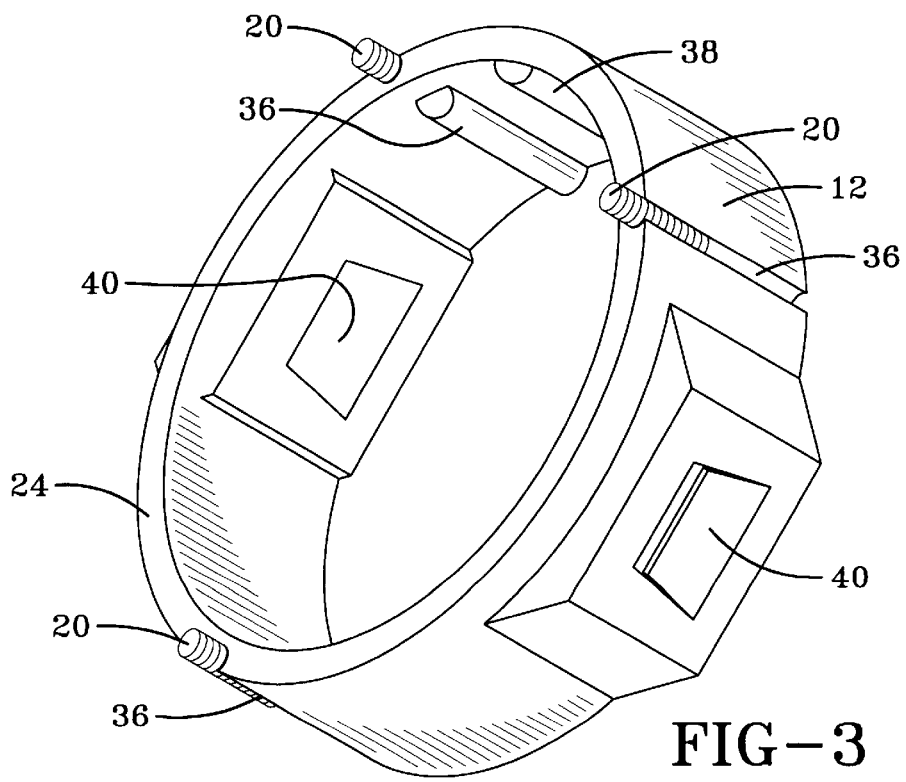
FIG. 3 is a perspective view of a horn ring.

FIG. 3 is a perspective view of the horn ring 12 shown in FIG. 1. Borings or grooves 36, 38 are distributed over the periphery in the horn ring. The grooves 36, 38 extend, in the longitudinal direction of the airbag module, i.e. in the unfolding direction of the airbag. The grooves 38 are opened in the longitudinal direction towards the rear, opposite the emission direction of the gas bag, whereas they are closed on the front side. The grooves 38 accommodate the springs 22. The springs 22 support themselves with their one end on the closed side of the grooves 38 and with their other end engage a receiving device, to bias the entire airbag module in a fixed state in relation to the receiving device. In this manner a play-free and tight fastening within the vehicle can be achieved. Furthermore, as described above, the dismounting of the airbag module is rendered easier. The horn springs 20 are arranged in the grooves 36. The horn springs 20 support themselves in the horn ring 12 and extend in the longitudinal direction towards the front from the grooves 36, to engage the flange or projection 13 on the airbag housing 2. In this manner the horn springs 20 ensure a resilient motion of the airbag housing, 2 in relation to the horn ring 12. The horn springs 20 in addition favor the dismounting of the airbag module, since they push the airbag housing 2 out of the horn ring 12, when the projection 24 of the horn ring 12 is disengaged from the projection 26 of the airbag housing 2.

The horn ring 12 furthermore comprises on its periphery catch hooks 40, which serve to lock the horn ring 12 and thus the entire airbag module on a receiving device, preferably on a steering wheel frame. The catch hooks 40 are resilient elements, which project radially from the horn ring 12. For the dismounting of the airbag module, the catch hooks 40 are simply, for instance with the help of a screw driver, pushed inwards, whereby they disengage, so that the airbag module can be disassembled. The horn ring 12 as well as the airbag housing 2 are preferably manufactured as one piece out of synthetic material, for instance by injection molding.

Figure 4:
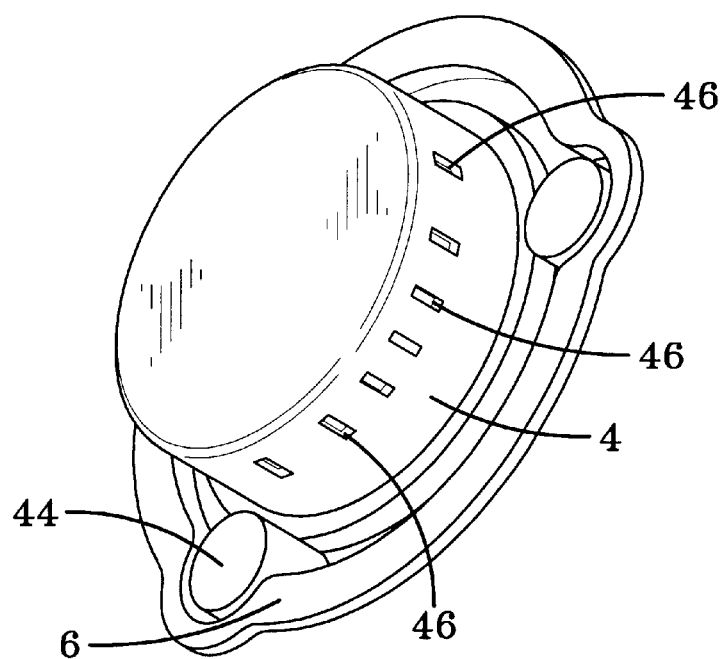
FIG. 4 is a perspective view of an inflator.

FIG. 4 is a perspective view of an inflator 4, as is shown in FIG. 1. The inflator 4 is connected to the inflator carrier 6 by vibration-arresting or -damping elements 44. The inflator 4 and the inflator carrier 6 are inserted through the receiving opening 30 from the rear into the airbag housing 2, so that the inflator 6 extends into the inside of the airbag housing 2. The vibration-damping elements 44 enable a resilient bearing of the inflator 6 in relation to the inflator carrier 6. This enables the mass of the inflator 6 to be used as a vibration arrestor, for instance for a steering wheel of a motor vehicle. Gas emission openings 46 are foreseen peripherally in the inflator 4.

Figure 5:
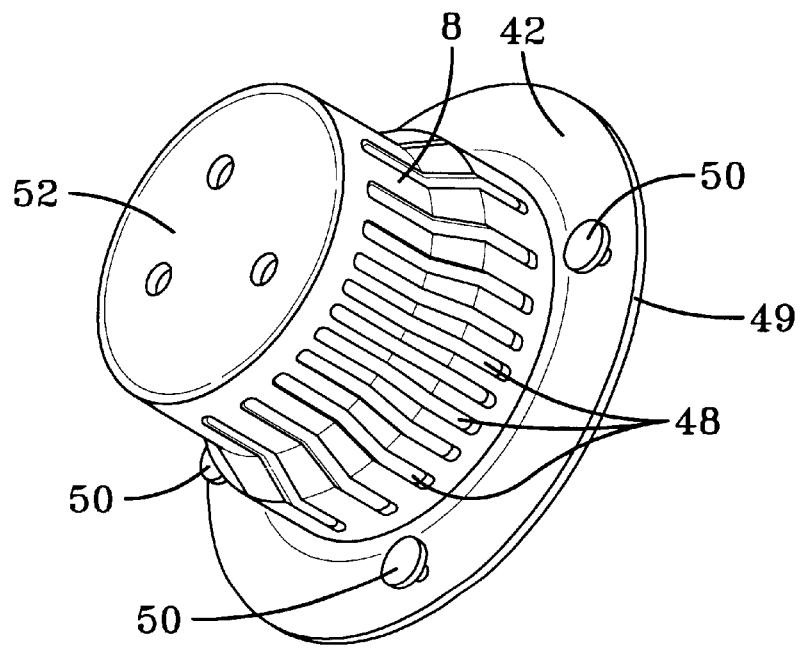
FIG. 5 is a perspective view of a diffuser.

FIG. 5 is a perspective view of the diffuser 8 according to FIG. 1. The diffuser 8 is essentially pot-shaped and comprises on its outer periphery gas emission openings 48 in the shape of slots. The diffuser 8 comprises at its rear end an opening 49, into which the inflator 6 can extend. During the ignition of the inflator 4, the gas flows from the gas emission openings 46 of the inflator 6 and subsequently through the gas emission openings 48 of the diffuser 8 into the airbag. On the periphery of the opening 49 of the diffuser 8 a flange 42 is arranged, on which fastening elements 50 are foreseen, with which the diffuser 8 is secured in the airbag housing 2, preferably on the fastening openings 32. On the front side of the diffuser 8 a retainer or a support plate 52 is arranged. Between the support plate 52 and the underlying part of the diffuser 8, a front surface of the airbag (not shown here) is securely clamped, so that the latter is also securely fastened to the diffuser 8 during the inflated state of the airbag. In the inflated state, a funnel-shaped airbag is thus created, which ensures an improved occupant protection in out-of-position cases. The diffuser 8 thus controls the inflation and unfolding of the airbag.

Figure 6:
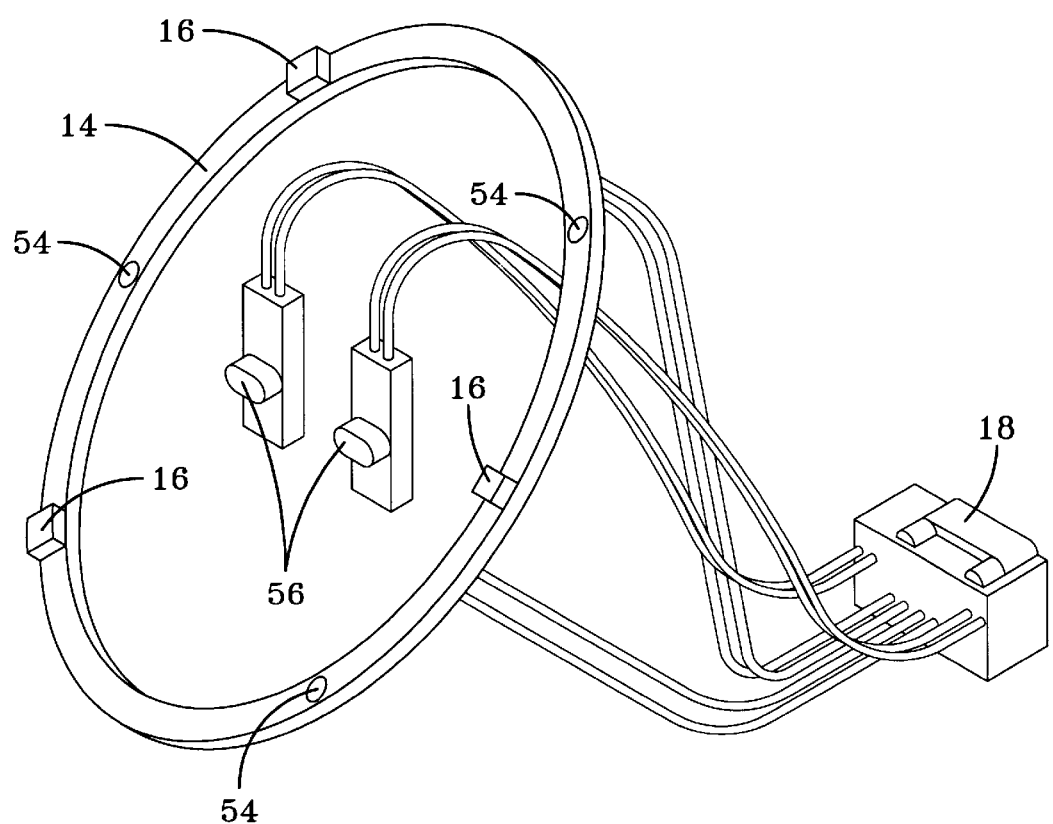
FIG. 6 is a perspective view of a horn contact plate with connector plug.

FIG. 6 is a perspective view of the horn contact plate or the horn plate 14. On the horn plate 14, microswitches 16 are arranged for the actuation of the horn. On the horn plate 14 transition openings 54 are arranged, through which the horn springs 20 extend in their assembled state. The horn plate 14 is connected to the connector plug 18 by cables. In addition, the connector plug 18 is connected by cables to connector plugs 56 for the connection with the inflator 6. The airbag module according to the invention thus comprises only one single connector plug 18, for the horn as well as the inflator 6, whereby the assembly process is significantly simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An airbag module comprising at least one airbag housing that can be locked with a receiving device in a motor vehicle and in which at least one inflator and a folded airbag are arranged, and springs are provided on the airbag housing to bias the airbag housing in an installed state in relation to the receiving device, whereby the springs are arranged in a horn ring that is disposed in a region of and surrounding an outer periphery of the airbag housing, the horn ring having horn contacts arranged peripherally to the airing housing, the horn contacts and the inflator being connected with a common connector plug.

2. The airbag module according to claim 1 wherein the airbag housing is locked with the annular element.

3. The airbag module according to claim 1 further comprising horn springs that resiliently bias the airbag housing in relation to the horn ring.

4. An airbag module comprising at least one airbag housing that can be locked with a receiving device in a motor vehicle and in which at least one inflator and a folded airbag are arranged, and springs are provided on the airbag housing to bias the airbag housing in the installed state in relation to the receiving device, whereby the springs are arranged in the region of an outer periphery of the airbag housing, the springs being arranged in an annular element surrounding the periphery of the airbag housing and locked with the airbag housing, the horn contacts and the inflator being connected with a common connector plug.

5. The airbag module according to claim 4 further comprising horn springs that resiliently bias the airbag housing in relation to a horn ring.

6. An airbag module comprising at least one airbag housing that can be locked with a receiving device in a motor vehicle and in which at least one inflator and a folded airbag are arranged, and springs are provided on the airbag housing to bias the airbag housing in the installed state in relation to the receiving device, whereby the springs are arranged in the region of an outer periphery of the airbag housing in an annular element surrounding the periphery of the airbag housing, and further comprising horn springs that resiliently bias the airbag housing in relation to a horn ring having horn contacts associated therewith, the horn contacts and the inflator being connected with a common connector plug.

7. The airbag module according to claim 2 further comprising horn springs that resiliently bias the airbag housing in relation to the horn ring.

8. The airbag module according to claim 1 wherein a diffuser is arranged above the inflator.

9. The airbag module according to claim 1 wherein the horn ring, the airbag housing, and the inflator are nested into each other.

10. The airbag module according to claim 1 wherein the airbag housing is closed by a covering cap.

11. The airbag module according to claim 1 wherein the inflator is locked with or screwed onto the airbag housing.

12. The airbag module according to claim 1 wherein the inflator is mounted in a vibration-arresting material.

* * * * *